UNITED STATES PATENT OFFICE.

MELVIN B. CHURCH, OF GRAND RAPIDS, MICHIGAN.

COVERING FOR WALLS AND OTHER SURFACES.

1,166,325.     Specification of Letters Patent.     Patented Dec. 28, 1915.

No Drawing.     Application filed June 19, 1914. Serial No. 846,054.

*To all whom it may concern:*

Be it known that I, MELVIN B. CHURCH, citizen of the United States, residing at Grand Rapids, Michigan, have invented certain new and useful Improvements in Coverings for Walls and other Surfaces, of which the following is a specification.

My invention hereinafter described relates to the ornamental and sanitary covering of walls and ceilings. It is in the class of my previous inventions relating to what is well known as alabastine, originated by me, which inventions under various improvements relating thereto are set forth in patents granted to me by the United States Patent Office. The first of these and the beginning of this special art was granted April 6, 1875, and numbered 161,591. This patent covered the first compound of pulverized calcined gypsum with animal glue in condition for application by brushes when mixed with water. This compound is largely used, but I had difficulties in its application arising from the necessity of care and skill on the part of the workman applying it. These difficulties are discussed hereinafter in connection with my present invention, designed to obviate them all, and comprising a composition of finely pulverized uncalcined gypsum and animal glue prepared in substantially the same way for mixing with water. It is only recently after many years of experimenting and experience that I have discovered the advantages of the use of uncalcined gypsum in this art, and also the advantage of the use of an alum solution in connection therewith.

In the use of my original wall covering when made in dry form according to my specification of Patent No. 255,937, April 4, 1892, the alabastine was liable to special defects incident to the use of boiling water. This was remedied by my improved process in Patent 513,003, whereby I was able to use water of ordinary atmospheric temperature. But this still required frequent stirring and thinning of the material in the application, the gypsum in the intervals absorbing considerable percentage of the water and glue, weakening the adhesive quality. This resulted in variation in the appearance of the coating during the process of finishing the wall. As a result of my aforesaid discovery, I am able to improve the flow of the material under the brush and to improve the durability of the surface covering, maintaining fully the sanitary conditions, and as aforesaid effecting improvement in the wall covering in application and appearance.

I take the natural uncalcined gypsum and animal glue finely divided and thoroughly and evenly mixed in dry form. In this condition it may be put up in packages as in ordinary paper, and kept indefinitely without damage, and is ready for use by adding water of any ordinary temperature. It may be also prepared under wet conditions and so marketed in paste form, being subsequently diluted, according to the judgment of the workman.

The clear uncalcined gypsum is too transparent for general uses, but may be used with good results upon a natural wood surface, or over a colored foundation, thus giving an appearance of pure alabaster, and may be properly smoothed and polished. This is particularly applicable as a carriage surfacing and for painting generally, the surface being smooth and filled with oil preferably mixed with turpentine or naphtha, this surface being rubbed and leveled first dry, or with the oil mixture, according to the judgment of the workman for the grade of surface required. But when a more opaque covering is required, as in frescoing or calcimining, I add to the uncalcined gypsum and glue inert substances such as whiting or clay, and these may be used with coloring matters if desired.

For many purposes a coating of alum is used in combination in the finished coating applied separately over each coating of this my new compound, or of such as calcimine, which is first applied and dried and then the coating of alum solution added and then repeating the tinting while the solution is damp or when dry, and one or more of these coatings may be used as a foundation for papering or painting.

In my original patent I used about ten per cent. of glue with variations of the amount, and in this also the amount of glue may be varied according to the quality of work or condition of surface. The alum solution has a hardening and preserving and sanitary effect, and causes the coating to resist vigorous brushing for re-coating, such as subjected to when harsh brushes are used in the hands of amateur workmen. The second coat may be applied without waiting for the drying of the alum solution and preferably so over suction surfaces. The alum so combined with the uncalcined gypsum in a finely divided state acts upon it substantially as when applied to the uncalcined and unground alabaster rock in the known process of producing artificial marble. The alum solution may be usefully applied in hardening old coats or of any coating composed of a base and glue as calcimine, when it is desired to re-coat without removing the old coat. But it is not always necessary to use the hardening solution. As above indicated, a coating of oil or of oil paint may be applied directly over the uncalcined gypsum and glue whether hardened by the alum or not, and the coating holds the oil without oxidation and so that exposure to the heat of the sun does not drive the oil into the wood or draw it up through the subsequent coating of paint or varnish, and the water cement so treated being of a cold, stony nature, preserves the paint and varnish applied over it better than do surfaces produced with paint in the usual way.

It will, of course, be understood that with finely pulverized raw gypsum mixed with water there is no setting tendency. It also and from the same quality prevents difficulties arising from dampness from the use of calcined gypsum, after the coat is applied and when used on walls subjected to steam as in kitchens, due to the discoloration by the absorption of water. Its smooth grainy quality effects and facilitates the flow under the brush. This quality assists in the stirring of water into the dry mixture when the workman is mixing in water for use. I use a large latitude, preferably using the clear uncalcined gypsum as before described for certain surfaces, and when I use it as an ordinary water coating or calcimine I use a large proportion of whiting or the like larger than that sometimes of the uncalcined gypsum. I found proportions of forty per cent. of the uncalcined gypsum to sixty per cent. whiting available and successful for somewhat rough inabsorbent walls, but it would be understood that these proportions may be varied with varying effects for different surfaces as well known to skilled workmen.

In making the alum solution, I use about a half ounce of powdered alum to one pint of water, though for hardening the coating for re-coating where a slight discoloring is not detrimental, I sometimes use an ounce of alum to a pint of water. When it is desired to render the finished tinting or white hard enough so that it will resist vigorous sponging with water, a solution is used as strong as may be without leaving a trace of the white alum visible on the surface of the tinting. For carriage surfacing I prefer a strong solution of alum in water.

The skilled workman will understand that he may produce the best results with one coating of this my improved compound as with any good water coating, and that for this purpose he does not require the mixture to be strongly sized, and with my improved method including the alum solution the coating can be used weak in sizing, and when he has this alabastine in the prepared dry and sized form, he may reduce it by adding whiting, and if he finds that he has not produced the desired result with his first coating, he may apply a coat of the alum solution, and then a second coating of tint or white, so that according to his judgment he will vary the proportion of glue in the compound to adapt it to the various kinds of work.

When to be used for producing a foundation as for surfacing for painting carriages and the like, the addition of whiting as a base should not be practised to any appreciable extent and particularly so when producing a translucent finish as on natural wood. This method with uncalcined gypsum is adapted for finishing cheaply or to a high degree of finish either for a rubbed dead white or polished finish. For this purpose I add a percentage of dry oxid of zinc to the uncalcined gypsum and glue, and for this purpose a pure grade of glue as gelatin used for culinary purposes.

Uncalcined gypsum in its natural condition, alabaster rock, sulfate of lime, is quite transparent and when ground in the ordinary way as it is ground in producing plaster of Paris as I had used it, this transparent nature was maintained when mixed in water, but in looking for a material to substitute for calcined gypsum to use with whiting and the like, to produce coating compound which, having no setting action can be allowed to stand mixed in water from day to day without changing consistency, I tried the gypsum in this uncalcined form in place of the calcined product which I had been so using. In putting this through the same grinding and mixing method that I use in producing my alabastine ready for the market, I discovered that the uncalcined gypsum being thus very finely ground and mixed with glue and water, produced a coating having considerable covering body. This natural gypsum product being of a crystal or glass-like character and of about the same specific gravity as the carbonate of lime in the form of whiting which is composed of very fine particles in its natural condition, these ingredients did not separate or settle apart, and this combination served to give the grainy, flowing character to the whole mass, under the brush, and to the surface some of the grainy and crystalline character, of the pure alabaster mentioned in the foregoing specification, and the alum solution applied over and so penetrated into this combination coating hardens the whole, rendering the durable and sanitary coating product finished on the wall or other surface.

Certain of the subject matter described herein will be made the subject of a divisional application.

I claim substantially as described:—

1. A surface water coating composition comprising finely pulverized uncalcined gypsum and glue.

2. A surface water coating composition comprising finely pulverized uncalcined gypsum and glue mixed with whiting.

3. A surface water coating composition comprising finely pulverized uncalcined gypsum mixed with an inert powder and glue.

4. A surface coating composition comprising animal glue, mixed with pulverized uncalcined gypsum, and an inert powder in the proportions substantially of forty per cent. uncalcined gypsum and sixty per cent. of the inert powder.

5. A surface coating composition comprising finely pulverized uncalcined gypsum as a foundation mixed with a comparatively small proportion of glue, substantially as described.

6. A surface coating composition comprising finely pulverized uncalcined gypsum mixed with whiting as a foundation, and a comparatively small proportion of glue.

7. A surface coating composition comprising finely pulverized uncalcined gypsum mixed with an inert powder as a foundation, and a comparatively small proportion of glue.

In testimony whereof I affix my signature in presence of two witnesses.

MELVIN B. CHURCH.

Witnesses:
F. L. MIDDLETON,
BENNETT S. JONES.